United States Patent [19]

Bachman

[11] 4,386,693

[45] Jun. 7, 1983

[54] TRANSFER APPARATUS

[75] Inventor: Jack L. Bachman, Newtown, Pa.

[73] Assignee: The Budd Company, Troy, Mich.

[21] Appl. No.: 256,954

[22] Filed: Apr. 23, 1981

[51] Int. Cl.³ .............................................. B65G 47/24
[52] U.S. Cl. .................................... 198/409; 198/486; 414/752
[58] Field of Search ............... 198/485, 486, 489, 490, 198/339, 586, 836, 409, 631, 482; 414/222, 225, 749, 750, 751, 752

[56] References Cited

U.S. PATENT DOCUMENTS

| 1,894,881 | 1/1933 | Mayo | 198/631 |
| 3,442,189 | 5/1969 | Robinson et al. | 198/311 |
| 3,884,363 | 5/1975 | Ajlouny | 414/751 |
| 4,149,623 | 4/1979 | Nelson | 198/482 |

FOREIGN PATENT DOCUMENTS

468843  7/1975  U.S.S.R. ............................... 198/409

Primary Examiner—Joseph E. Valenza
Assistant Examiner—Jonathan D. Holmes
Attorney, Agent, or Firm—Edward M. Farrell; Herman Foster; Thomas I. Davenport

[57] ABSTRACT

Transfer apparatus is adapted to receive a mechanical part from a die and transfer it to a subsequent die. The apparatus may be movably aligned in place and includes means for aligning the part received from the first die and position it to permit transfer to the subsequent die.

8 Claims, 10 Drawing Figures

TRANSFER APPARATUS

BACKGROUND OF THE INVENTION

Automation equipment involving the transfer of pieces from one location to a subsequent location has been used extensively. For example, I.S.I. Manufacturing Inc. of Fraser, Mich. have manufactured a number of items used in automation equipment involving the transfer of pieces from one location to the other. Such automation equipment or transfer apparatus have generally involved means for taking a piece from a first die by suitable gripping means, such as by suction cups or movable arms. Means for transporting the piece held are provided to carry the piece away from the first die and feed it into the second die.

Most such automation equipment have involved apparatus specifically designed for particular dies and for particular pieces formed by the dies. Such specific design generally limits the use to which such automation equipment may be put without specifically redesigning a number of the parts in the equipment. It is desirable in such transfer apparatus that the apparatus be adaptable for use in a variety of different environments. For example, it is desirable to have transfer apparatus which is adapted to be easily moved and aligned between different dies in manufacturing line. It is also desirable that such transfer apparatus be adapted to receive and transfer parts of different sizes and to align the parts handled so that the piece from the first die may be manipulated to permit it to be inserted into the subsequent die.

OBJECTS OF THE INVENTION

It is an object of this invention to provide transfer apparatus for transferring a piece from one die to a second die wherein the apparatus is readily movable between the dies for proper alignment.

It is a further object of this invention to provide transfer apparatus which is adjustable to receive pieces of different sizes from a first die for transfer to a second die.

It is still a further object of this invention to provide alignment means on the transfer apparatus to permit relative positioning of the part as it is being transferred.

It is still a further object of this invention to provide means for manipulating or positioning the part being transferred from a first die to reposition it in accordance with the requirements of a second die.

It is still a further object of this invention to provide transfer apparatus in which the means for transferring parts is adapted to be readily changed to permit different parts to be carried.

SUMMARY OF THE INVENTION

In accordance with the present invention, transfer apparatus is provided for transferring a part from a first die to a second die. The part received from the first die is properly aligned prior to the subsequent step of transferring the piece to a conveyor. When the piece has been transferred to the end of the conveyor means for lifting the piece away from the conveyor and rotating the piece is provided so that the part is in the proper position to be fed to the second die. Adjustable means for gripping the part and lifting the part to the proper level is provided. After the part has been lifted, it is carried into the second die.

Other objects and advantages of the present invention will be apparent and suggest themselves to those skilled in the art, from a reading of the following specification and claims, taken in conjunction with the accompanying drawings.

DETAILED DESCRIPTION OF THE PREFERRED EMBODIMENTS

Figure 1:
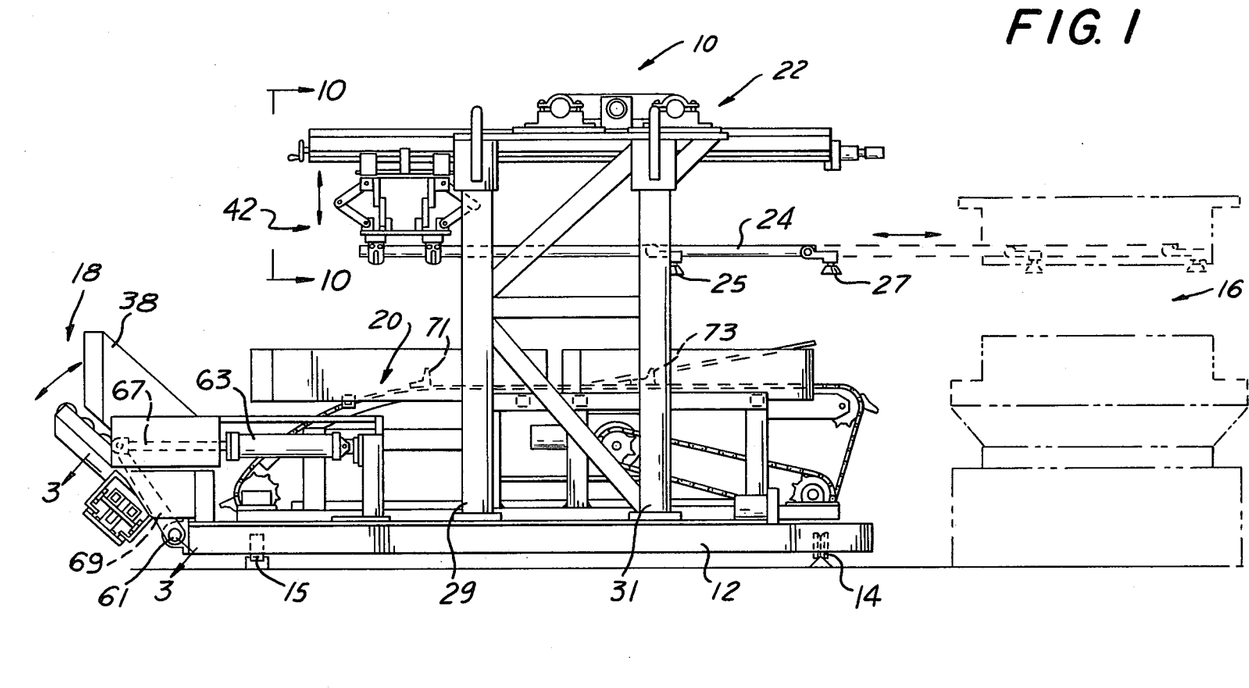
FIG. 1 is a side view of transfer apparatus in accordance with the present invention.
Figure 2:
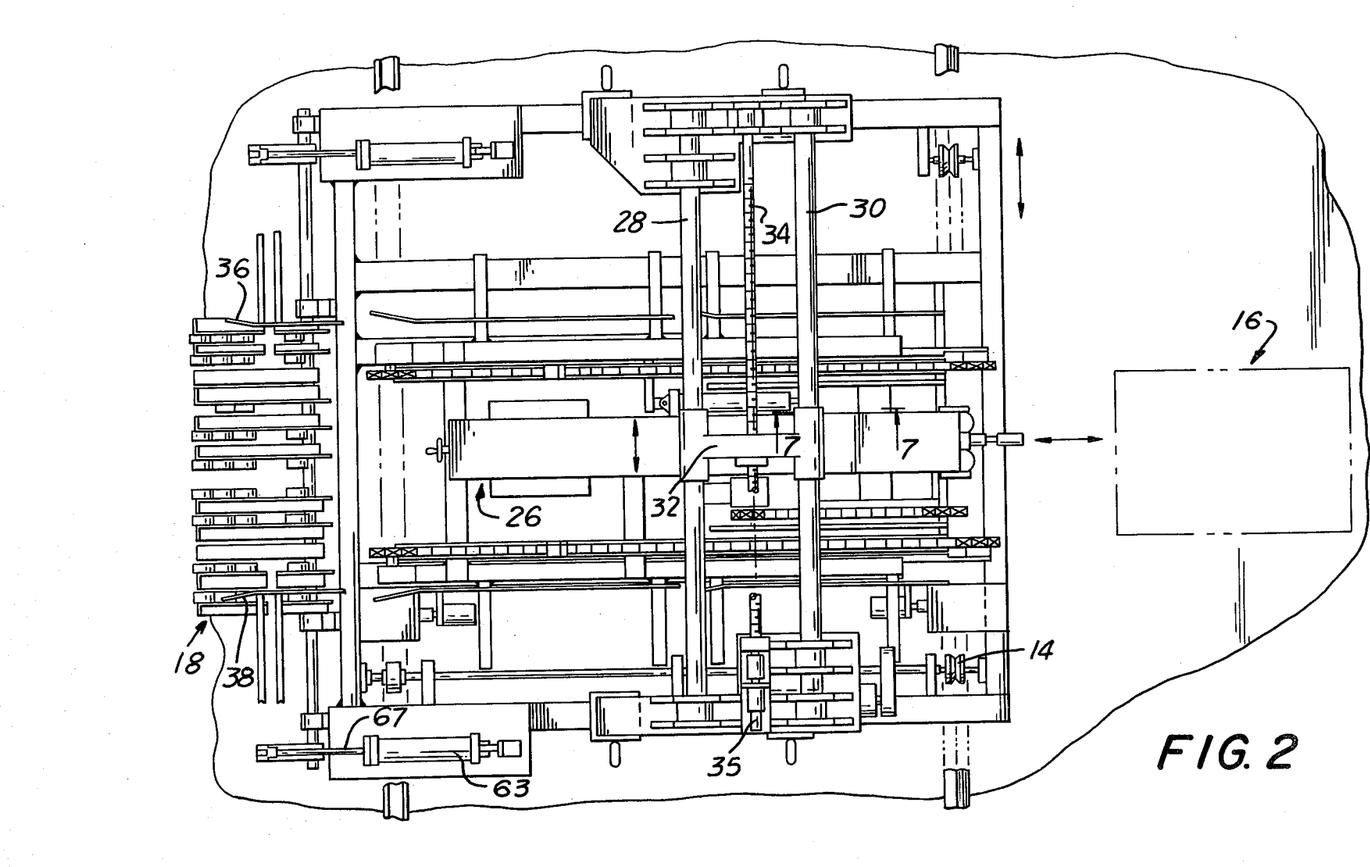
FIG. 2 is a top view of the transfer apparatus illustrated in FIG. 1.

Referring to FIGS. 1 and 2, transfer apparatus 10 includes a base frame 12 movably mounted on wheels 14 and 15 adapted to ride on suitable base members. The transfer apparatus 10 is adapted to move a part from left to right from a first die (not illustrated) to a second die 16. The movability feature of the entire transfer apparatus 10 makes it readily adapted to be moved to different parts in a factory for different production runs involving different parts at different locations.

A piece, not illustrated but which, for example, may be an inner or outer door panel to be used in an automobile, is received from the first die, is transferred from the left-hand side and dropped on a turnover positioner 18. As will be described, after receiving the part, the turnover positioner 18 turns over the received part and drops it on a movable chain conveyor 20. The part is moved to the end of the conveyor 20 to a lift and turntable device (to be illustrated and described in connection with subsequent figures of the drawings) which lifts the part away from the chain conveyor 20. As will be described, the turntable device may then rotate the part 90° so as to accommodate the dimensions of the subsequent die 16. The turntable lifts the part in position to permit an overhead gripping mechanism 22 to be first adjusted into position and then lowered to grip the part. The gripping mechanism is then extended (as indicated by the dashed lines) to pass the part into the die 16. As will be further described, the overhead gripper mechanism 22 includes means for lowering and raising shafts 24. The gripping mechanism 22 includes grippers, such as suction cups 25 and 27, which grip the piece which has been lifted and rotated if necessary, at the end of the conveyor chain. After gripping the piece, the gripping suction cups 25 and 27 mounted to the shafts 24 are lifted to the proper height. The shaft 24 is then extended to extend the suction cups 25 and 27 with its piece into the die 16 where the piece is released.

The overhead gripper assembly 22 comprises an overhead shuttle assembly 26 (FIG. 2) mounted to suitable posts 29 and 31 which are secured to the base 12.

The shuttle assembly 26 is attached to a connector 32. A pair of shafts 28 and 30 extend transversely across the transfer apparatus 10 through the connector 32. A screw shaft 34 extends transversely across the transfer apparatus and threadedly engages the connector 32. A conventional ball screw mechanism may be included in the connector 32 so that when a screw actuator 35 turns the screw 34, the connector 32 moves on the shafts 28 and 30. Adjustment of the screw causes the piece 32 and the shuttle assembly 26 to be moved transversely across the transfer apparatus 10. When the shuttle assembly 26 is moved, the suction cups 25 and 27 are transversely positioned. Thus, the grippers or suction cups may be transversely adjusted for alignment with the dies and the part to be picked up and transferred.

A piece received by the turnover positioner 18 is received between a pair of end plates 36 and 38. As will be described, the distance between these plates may be adjusted to accommodate different size parts. Also, once the distance is determined, the pair of plates are movable transversely to permit alignment with the dies and conveyor belt.

When a piece is dropped on the turnover positioner 18 between the end plates 36 and 38, the positioner is rotated about a pivot to drop the piece onto the chain conveyor 20. The piece is then transferred to the end of the conveyor chain 20. It is now ready to be lifted by the overhead gripping apparatus 22. As mentioned, the screw 34 at this point has been first adjusted so that the suction cups 25 and 27 are precisely positioned so as to grip the piece and lift the piece carried by the conveyor.

As will be described, after the piece carried by the conveyor 20 reaches the end of the conveyor, it is lifted. Sometimes it is necessary to rotate the piece so as to accommodate the dimensions of the subsequent die 16. After the piece has been lifted and rotated if necessary, a lowering mechanism 42 then lowers the shuttle assembly 26 to lower the suction cups 25 and 27 to permit them to grip the piece lifted by the turntable apparatus to be described in connection with FIG. 7.

Thus it is generally seen in FIGS. 1 and 2 that the transfer apparatus 10 includes a number of alignment features. The entire apparatus 10 may be moved on the wheels 14 and 15. Next, when the piece is received from the first die, it is positioned between the end plates 36 and 38 and transversely aligned. At the end of the conveyor 20, the piece is lifted and rotated if necessary. The shuttle assembly 26 may be transversely positioned to line up the suction cups with the piece and also to align the piece with the next die 16.

Referring to FIGS. 3, 4, 5 and 6, the main details of the turnover and positioning mechanism 18 are illustrated. As previously mentioned, the turnover and positioning mechanism 18 is first adjusted to receive the part from a first die. The part involved may be different sizes for different production runs. The initial set up of the mechanism 18 involves setting the distance between plates 36 and 38 through a predetermined distance in accordance with the length of the part being received from the first die.

Figure 6:
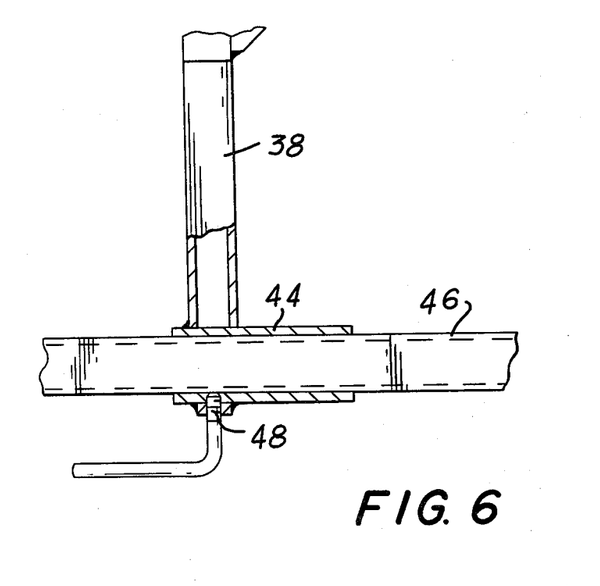
FIG. 6 is a cross-sectional view taken along lines 6—6 of FIG. 3.

As illustrated in FIG. 6, the plate 38 is mounted onto a slideable sleeve 44. The slideable sleeve 44 is adapted to slide back and forth onto a tube 46. When the plate 38 is properly positioned, a screw 48 passing through the sleeve 44 is used to tighten the sleeve 44 to the tube 46 to maintain the plate 38 in a fixed position. A similar arrangement is provided for adjustment of the plate 36, the details of which are not illustrated.

The plates 36 and 38 are first manually adjusted in the manner described so that the distance therebetween is dimensioned to that of a piece being fed from the first die.

During the initial set up of the transfer mechanism 18 with respect to the first and second dies, in addition to adjusting the distance between the plates 36 and 38, it is also generally necessary to move the plates 36 and 38 so that they are properly aligned with the dies and disposed to pass the received piece onto the subsequent movable chain conveyor 20.

The tubing 46 which receives the sleeve 44 and plate 38 are mounted to a plate or block 50. In like manner, a tube 52, connected in a manner similar to tube 46 described in connection with FIG. 6, also is connected to the block or plate 50. After the plates 36 and 38 have been aligned, they are maintained in fixed positions with respect to each other along with their respective tubes 46 and 52. The block or plate 50, however, is adapted to move between said support members 54 and 55 suitably secured to a base member 57. Movement of the plate 50 with its attached tubes 46, 52 and side plates 36, 38 is accomplished to permit alignment of the piece carried between the plates 36 and 38 to be properly aligned with the first die and the subsequent conveyor 20. Generally, once this adjustment is made, no further adjustments of the mechanism 18 is required for the production run of a part of a particular size.

Figure 3:
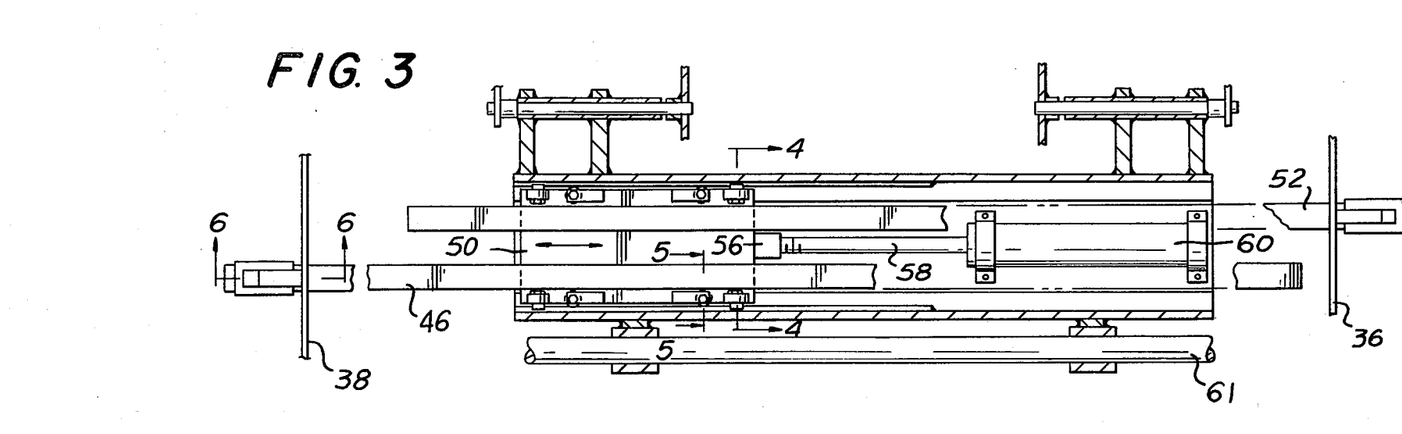
FIG. 3 is a cross-sectional view taken along lines 3—3 of FIG. 1.

The plate 50 is fixedly secured to a block 56 having a shaft 58 attached thereto. The shaft is connected to a pneumatic mechanism 60 which is adapted to selectively move the shaft 58 to predetermined positions to position the plates 36 and 38 to the proper alignment.

The plate 50 is connected to roller mechanisms 62 and 64 which are secured to the side members 54 and 55. Consequently, when the pneumatic cylinder 60 is actuated, the entire assembly between the side members 54 and 55 is moved in accordance with the movement of the shaft 58.

Figure 4:
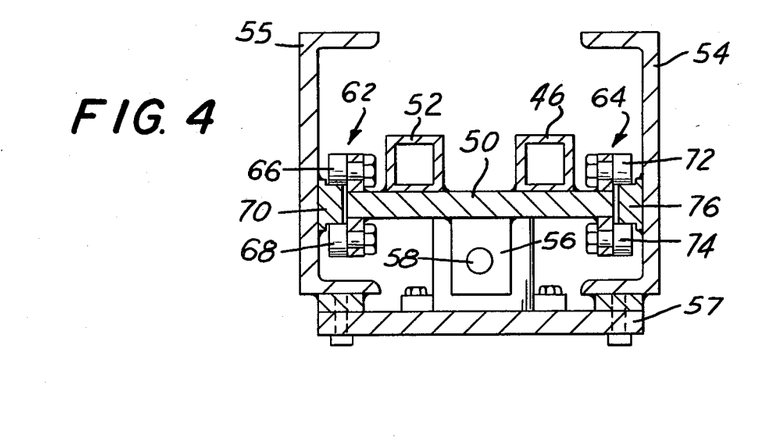
FIG. 4 is a cross-sectional view taken along lines 4—4 of FIG. 3.

The bearing mechanisms 62 and 64 are adapted to ride on rollers which are secured to the end of the plate 50. In the mechanism 62, rollers 66 and 68 are rotatably mounted to the ends of the top and bottom of the plate 50. The rollers 66 and 68 are adapted to roll along a track 70 which is secured to the side member 55. In like manner, rollers 72 and 74 are mounted on opposite sides of the plate 50 and spaced to roll along a track 76 which is secured to the side member 54. The spacing of the various bearings with respect to the track maintains the alignment of the plate 50 and consequently the alignment of the various other parts connected to the tubes 46 and 52. This alignment is precise for the vertical plane as illustrated in FIG. 4. To accommodate the alignment in the horizontal plane, similar sets of bearing mechanisms similar to mechanisms 62 and 64 are employed, as illustrated in FIGS. 3 and 5.

Figure 5:
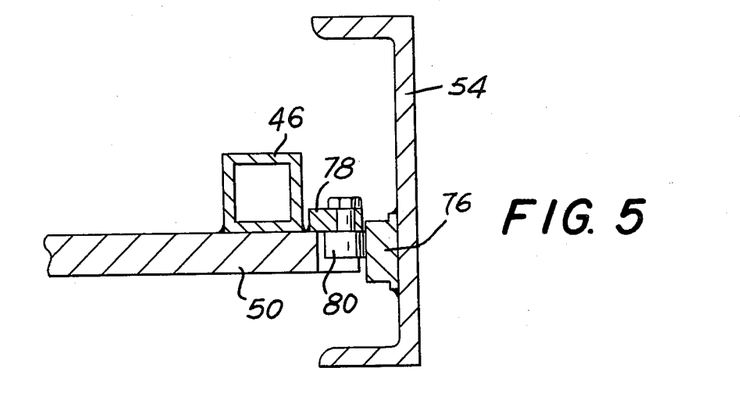
FIG. 5 is a cross-sectional view taken along lines 5—5 of FIG. 3.

Referring to FIG. 5, one of the bearing mechanisms for the horizontal alignment is illustrated, it being understood that a similar bearing mechanism is connected to the other side of the plate 50. The plate 50 including the tube 46 includes a pivot element 78 for receiving a roller bearing 80. The roller bearing 80 is disposed to roll on the track 76 which is fixed to the side member 54.

As illustrated in FIGS. 1 and 2, after a piece has been loaded onto the mechanism 18, the mechanism 18 is turned over or partly rotated to drop the piece onto the conveyor 20. A rod 61 is actuated by a pneumatic cylinder 63 which actuates a rod 67 and a lever arm 69. The actuation of the motor may be timed by microswitches in electrical circuitry well known to those skilled in the art and therefore not illustrated. A similar operation occurs on both sides of the transfer apparatus and therefore only one side is described.

Following the transfer of the piece from the mechanism 18 to the conveyor chain 20, the piece is carried along the chain until it is ready to be lifted and transferred to the die 16. The chain conveyor 20 moves in steps with the piece between arms 71 and 73. The distance moved in equal to the distance between the arms 71 and 73. When a piece reaches the end of the conveyor, it is ready to be lifted from the conveyor.

Figure 7:
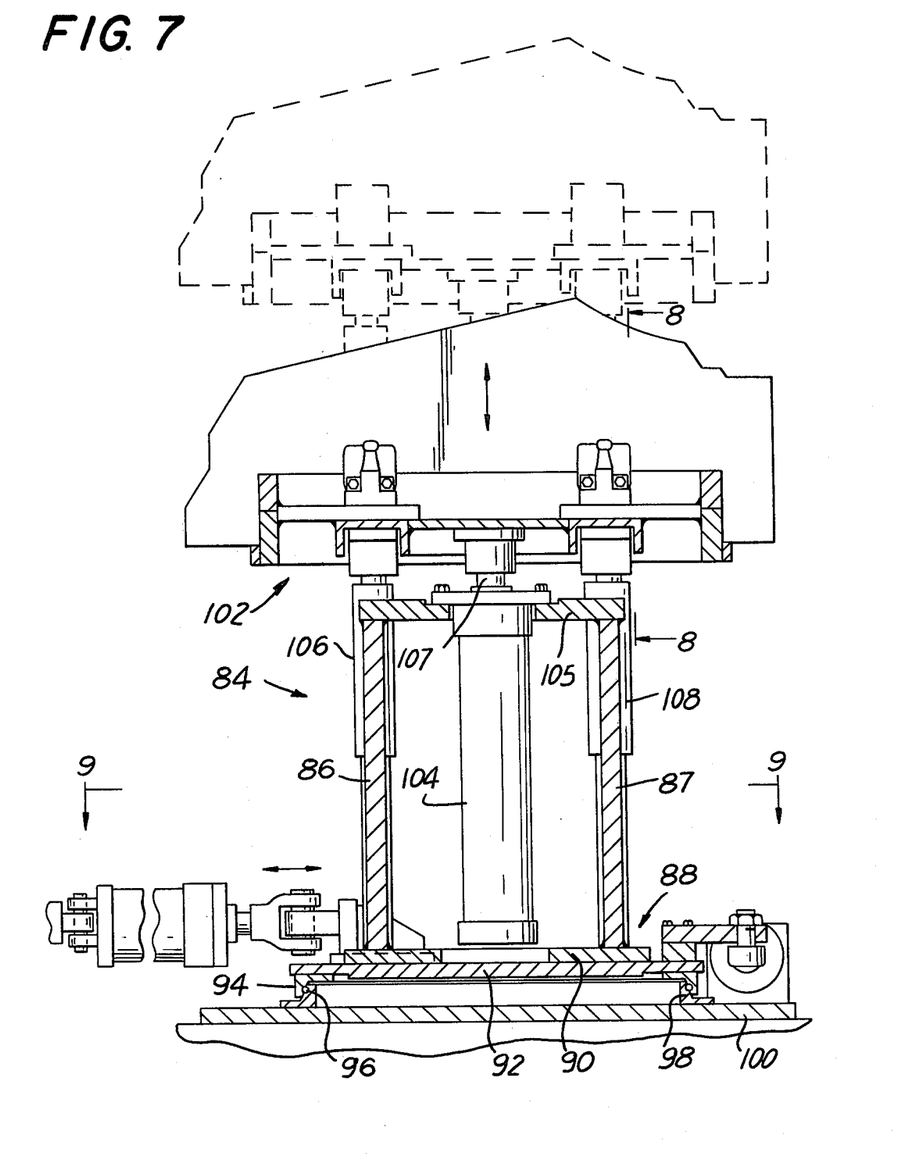
FIG. 7 is a cross-sectional view taken along lines 7—7 of FIG. 2.
Figure 8:
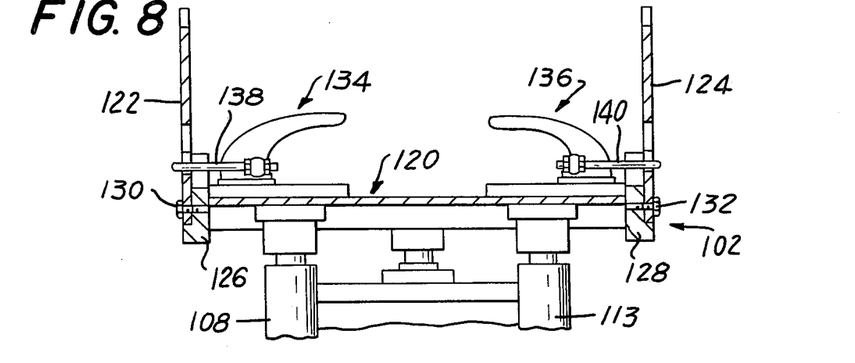
FIG. 8 is a cross-sectional view taken along lines 8—8 of FIG. 7.
Figure 9:
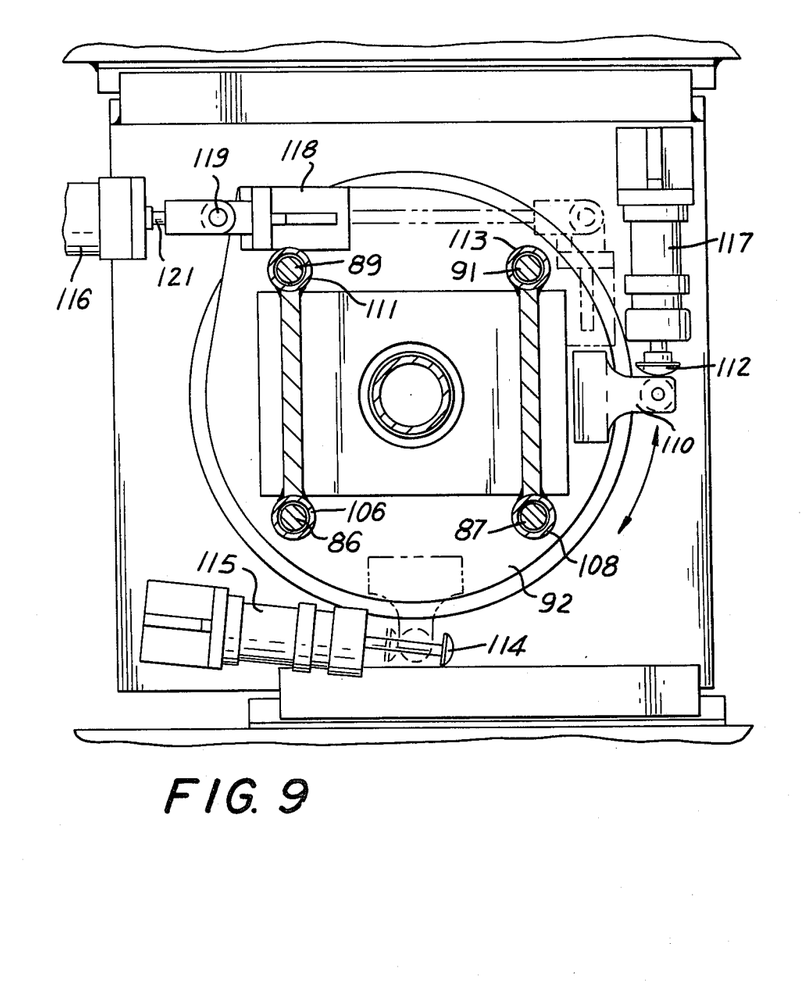
FIG. 9 is a cross-sectional view taken along lines 9—9 of FIG. 7.

Referring particularly to FIGS. 7, 8 and 9, details of the lift and rotate mechanisms mentioned in connection with FIGS. 1 and 2 are illustrated. This mechanism is designed to lift the piece from the end of the conveyor belt 20 and selectively moves it 90° if necessary to permit the piece to be gripped by the suction cups 25 and 27, illustrated in FIG. 1.

A lifter-positioner mechanism 84 includes guide shafts 86 and 87 suitably secured to a base assembly 88 which may be selectively rotated 90° with all its attached parts thereabove.

The base assembly 88 includes a bottom plate 90 secured to a rotatable circular base 92. The rotatable circular base 92 rides on bearing element 94 adapted to ride on bearings 96 which in turn are designed to move within grooves in the bearing element 98 which is secured to a base member 100 of the transfer apparatus.

The entire assembly connected to the sleeves 106, 108, 111 and 113 are adapted to slide along shafts 86, 87, 89 and 91 to lift an assembly 102 which is designed to hold the piece transferred to the end of the conveyor 20.

Various elements associated with assembly 102 are illustrated in FIG. 8. The assembly 102 is adapted to be selectively lifted by a pneumatic cylinder attached to top plate 105 through a shaft 107 to bring a piece held in close proximity to the suction cups 25 and 27 (FIG. 1) so that the piece may be lifted. The apparatus 102 is illustrated in a lifted position in the dashed lines of FIG. 7.

After the apparatus 102 with the secured piece is lifted, the apparatus 102 containing the piece may be rotated 90°, if necessary. The apparatus 102 is secured to sleeves 106, 108, 111 and 113. When the pneumatic cylinder 104 is operated, the sleeves 106, 108, 111 and 113 slide upwardly along the shafts 86, 87, 89 and 91 to thereby raise the assembly 102. Very often, the piece held by the assembly 102 is in the proper position to be fed to the next die 16 (FIGS. 1 and 2) and rotation thereof is not required. However, if rotation is required, the entire assembly 102 may be rotated 90°. An example of when rotation is required is when the width of the piece is relatively long and it is desired to feed the narrow end of the piece into the second die.

As illustrated in FIG. 9, the rotatable base 92 includes a stop member 110 secured thereto. The stop member is adapted to engage the plunger 112 of an absorber mechanism 117 in one position or plunger 114 of an absorber mechanism 115 as illustrated by the dotted lines in FIG. 9. The plungers 112 and 114 may be spring loaded to absorb the energy and shock when the turntable is rotated from one position to another.

Pneumatic cylinder 116 is connected to the base 92 through suitable pivotable connecting means 118 through a pivot connection. When the pneumatic cylinder 116 is actuated, the shaft 121 is extended and the base 92 is rotated in a clockwise direction so that the stop member 110 leaves the plunger 112 and engages the plunger 114. When the base 92 is rotated back to its original position, the shaft 121 of the pneumatic cylinder 116 is retracted in a well known manner.

Referring to FIG. 8, the assembly 102 for holding the tool includes a base plate 120. A pair of plates 122 and 124 are secured to the main part of the assembly 102 which includes base plate 102 having attachment elements 126 and 128 secured thereto. The side plates 122 and 124 are adapted to be secured to the members 126 and 128 by means of alignment screws 130 and 132 and clamp mechanisms 134 and 136. The plates 122 and 124 are held to the main part of the apparatus by means of "U" clamps 138 and 140 which extend through openings in the pieces 122 and 124 to loop over extending portions therein.

The plates 122 and 124 are adapted to be readily changed for different pieces to be received by the transfer apparatus. The plates 122 and 124 are shaped to receive the piece being transferred. If a different part is to be transferred, and the part to be transferred has a different shape than the shape of the part previously used, different types and shapes of the plates are installed and held by the clamp mechanisms 134 and 136. Consequently, it is seen that the lift and rotate apparatus is readily adapted to quickly change the plates holding the piece to accommodate pieces of different sizes and shapes. A similar arrangement of clamp mechanisms and pair of plates (not illustrated) may be disposed 90° from the clamp mechanisms and plates illustrated. This provides versatility when it is desired to hold the piece 90° away from the plates illustrated on similar plates and clamp mechanisms.

Figure 10:
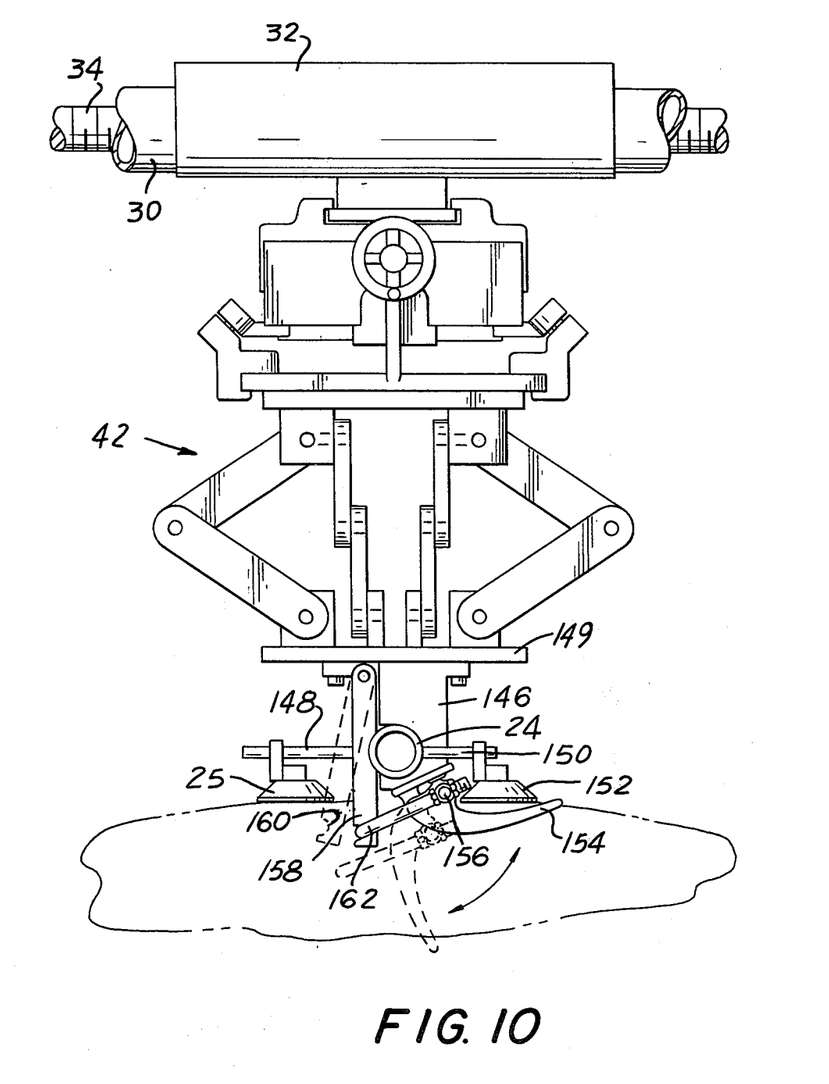
FIG. 10 is a view taken along line 10—10 of FIG. 1.

Referring to FIG. 10, the lowering mechanism 42 illustrated in FIG. 1 is shown in detail. The top end of the lowering mechanism 42 is connected to a connector 32 which is adapted to ride on a shaft 30 (and also on shaft 28 as illustrated in FIG. 2). Means for selectively moving the lowering mechanism 42 may be employed. The shaft 30 and connector 32 comprise part of the shuttle arrangement 26 illustrated in FIG. 2. The general shuttle unit configuration is a Model RPB5U Rack and Pinion Linear Shuttle Unit manufactured by I.S.I. Also, the basic lowering apparatus 42 is conventional and may also be of the type manufactured by I.S.I., for example, Model ASL4-7, which is called "Adjustable Straight Lift Unit Scissors Linkage".

A feature of the present invention involves a modification of the bottom end of the transfer apparatus. The shaft 24 (also in FIG. 1) is mounted in a member 146 which is secured to the bottom plate 149 of the conventional lowering mechanism 42. The shaft 24 includes oppositely extending arms 148 and 150 which hold suction cups 25 and 152. A clamp 154 is pivotted about a pivot element 156 and may be fitted around a rod 158 which includes a notch 160 therein. A U-shaped locking element 162 of the clamp 154 is adapted to lock the rod 158 to hold the shaft 24 when the handle of the clamp 154 is in the counterclockwise position, as indicated by the solid lines. When the clamp 154 is rotated in a clockwise direction, the U-shaped member 162 moves out of the notch 160 in the rod 158 and the shaft 24 may be released and moved away from the member 146. The release position of the various elements is illustrated by the dashed lines in FIG. 10. It is understood that a number of clamping mechanisms more than the two illustrated may be employed to hold or release the shaft 24. The feature illustrated in FIG. 10 provides a quick release for the shaft 24. This permits suction cups or grippers with mechanical arms of different sizes and shapes to be used dependent on the shape of the part to be gripped.

As previously mentioned, many of the overall features related to the present invention are conventional and well known to those skilled in the art. For the purposes of clarity, details relating to the conventional features are not illustrated in detail.

The machine illustrated in FIGS. 1 and 2 selectively moves and receives a piece from a first die and transfers the piece to the conveyor. The conveyor moves the piece to a position to be lifted where the conveyor stops at a predetermined position. The conveyor belt intermittently stops and starts when a piece is at the end of the conveyor ready to be lifted and another piece is being received by the apparatus. The automatic stopping and starting of the various elements illustrated may be controlled by various electrical circuits including microswitches and the like. The details of such electrical circuits are not directly related to the present invention, are known to those skilled in the art, and therefore not illustrated or described in detail. The pneumatic cylinders of the type used in the present invention are also well known. The means for selectively operating these motors are not illustrated because they are only incidentally related to the present invention.

The main features involved in the present invention involves those of alignment. First, the entire transfer apparatus may be aligned between a pair of dies because it is rollable on wheels. Next, the parts receiving the piece is adjusted for the size of the part involved with the part then being laterally aligned with respect to the positions of the feed and receiving dies. After the piece has been moved to the end of the conveyor belt, the piece is lifted and may be aligned by rotation of the piece, if necessary. Finally, the means for gripping the piece by an overhead shuttle may also be laterally aligned. Consequently, it is seen that the present invention has provided means for alignment which makes the transfer apparatus 10 particularly versatile and useful in different environmental conditions and useful for handling parts of different sizes and shapes.

Greater versatility of the transfer apparatus is also provided by the "quick change-over" features. The grippers on the shaft may be readily changed by operating relatively simple manual clamping mechanisms. Also, the plates for holding the piece on the lift apparatus may also be quickly changed by release of relatively simpler and convenient manual clamps.

What is claimed is:

1. Transfer apparatus for transferring a part longitudinally from a first station to a second station comprising:
   (a) receiving apparatus for receiving said part from said first station;
   (b) said receiving apparatus including a pair of spaced adjustable plates disposed to be spaced to receive said part therebetween;
   (c) adjustable means to laterally align said receiving apparatus with respect to said first and second stations;
   (d) conveyor means disposed to receive said part from said receiver apparatus and transport it towards said second station;
   (e) means for actuating said receiving apparatus to transfer said part to said conveyor means;
   (f) lifting means for lifting said part from said conveyor means;
   (g) gripping means to remove and hold said part away from said lifting means; and
   (h) longitudinally movable means for holding said gripping means to move a part held by said gripping means to said second station.

2. Transfer apparatus as set forth in claim 1 wherein means are provided to selectively rotate said lifting means prior to the removal of said part therefrom.

3. Transfer apparatus as set forth in claim 2 wherein said lifting means includes a plurality of manually operative clamps for holding removable plates dimensionsed to hold said part being lifted.

4. Transfer apparatus as set forth in claim 3 wherein lateral adjustment means are provided to laterally move said gripping means.

5. Transfer apparatus as set forth in claim 4 wherein said gripping means are connected through a connecting member to a pair of laterally extending beams and ball screw adjustment means are provided to move said gripping means on said beams.

6. Transfer apparatus as set forth in claim 5 wherein said longitudinally movable means further includes a lowering mechanism for holding a shaft connected to said gripping means.

7. Transfer apparatus as set forth in claim 6 wherein said shaft is secured to said lowering mechanism by means for second manually operative clamps to provide means for removal of said shaft and to permit different shafts with different gripping means to be connected to said lowering mechanism.

8. Transfer apparatus as set forth in claim 7 wherein means are attached to said transfer apparatus to permit the entire transfer apparatus to be moved to different positions between or away from said first and second stations.

* * * * *